May 31, 1955  R. G. PIETY  2,709,365
FLOWMETER

Filed July 18, 1949  3 Sheets-Sheet 1

INVENTOR.
R. G. PIETY
BY Hudson & Young
by: L. Malcolm Oberlin
ATTORNEYS

United States Patent Office 2,709,365
Patented May 31, 1955

2,709,365

FLOWMETER

Raymond G. Piety, Bartlesville, Okla., assignor to Phillips Petroleum Company, a corporation of Delaware Application July 18, 1949, Serial No. 105,295

19 Claims. (Cl. 73—155)

This invention relates to a flowmeter suitable for measuring permeability of a formation traversed by a drill hole. In another aspect, it relates to apparatus for measuring flow of fluids with a high degree of accuracy. In still another aspect, it relates to an electrical circuit for selectively operating heater elements and a motor forming a part of the flow meter while also measuring direct voltages produced by a series of thermocouple junctions.

The problem of providing an accurate measurement of flow in a well or drill hole has heretofore been very difficult due to a number of complicating factors. First, when using flow meters of the heater-thermocouple type, wherein liquid to be measured passes, in a vertical path, past a cold thermocouple junction, a heater, and a hot thermocouple junction, difficulties are encountered which result from convection currents produced by the heater element which alter the thermocouple readings so that the apparent or calculated flow rate is substantially at variance with the actual flow rate. Difficulties are also encountered in providing proper electrical connections for the thermocouples and other elements of the flowmeter structure without utilizing an excessive number of conductors extending from the flowmeter to the apparatus at the surface of the well or drill hole. Finally, difficulties have been encountered in isolating a section of the hole in which it is desired to take permeability measurements, especially when it is desired to measure the permeability of several adjacent formations, and errors in the flowmeter reading also arise unless the flowmeter is positioned at the exact center of the drill hole.

It is an object of this invention to provide apparatus for measuring flow which is free from the inaccuracies produced by convection currents.

It is a further object of the invention to provide a flowmeter in which the electrical connections between the surface equipment and the flowmeter require a minimum number of electrical conductors.

It is a further object to provide an efficient means for transferring energy to a plurality of heater elements, each of which is disposed between a hot and cold thermocouple junction.

It is a still further object of the invention to provide a flowmeter assembly in which a section of the formation may be readily isolated to determine the permeability thereof and in which inaccuracies resulting from the horizontal position of the flowmeter in the hole are compensated for.

Various other objects, advantages and features of the invention will be apparent from the following detailed description, taken in conjunction with the accompanying drawings, in which.

Figure 1:
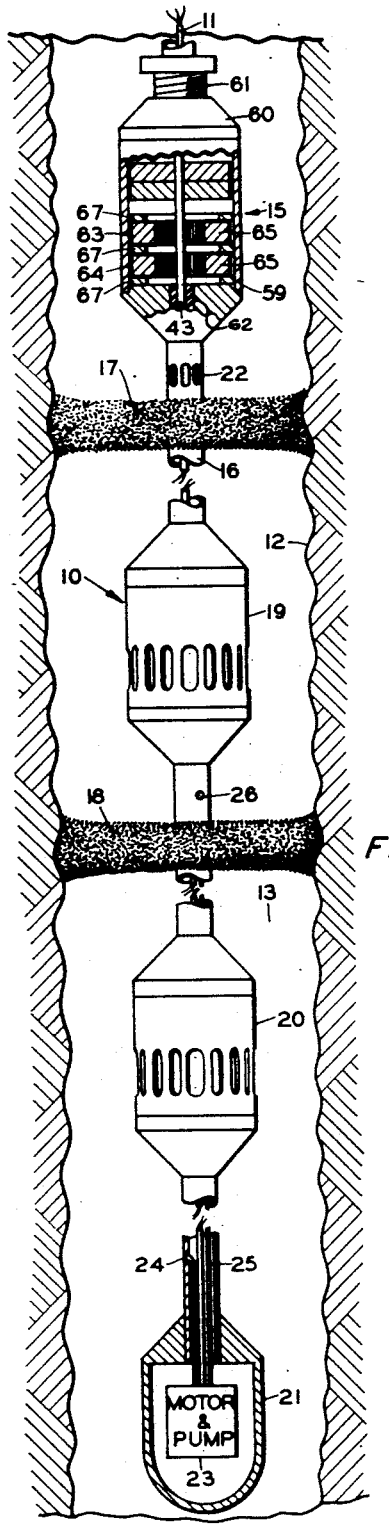
Figure 1 is a vertical sectional view, partially in elevation, of the complete flowmeter assembly.

Refering now to the drawings in detail, and particularly to Figure 1, I have shown a flowmeter assembly 10 suspended by a cable 11 in a bore or drill hole 12 which is filled with a liquid or mud 13. The assembly includes a transformer unit 15 having a pipe 16 depending therefrom, and this pipe carries a pair of packing devices 17 and 18, a pair of flowmeters 19 and 20, and a calibration pump-motor assembly 21.

The packing devices 17, 18 isolates the section of the drill hole included therebetween so that the rate of flow into the formation or out of the formation may be measured independently of the rate of flow into or out of neighboring strata. Preferably and advantageously, these packing devices are brushes having their bristles impregnated with a suitable sealing compound, such as grease. Such packing devices are described in detail and claimed in my copending application, Serial No. 77,634, filed February 21, 1949, entitled "Packing Device," now Patent No. 2,654,433.

In the present flowmeter assembly, water injected into the well flows into the pipe 16 through perforations 22 formed therein, a portion of this water being injected into the formation between packing devices 17, 18 after passing through the flowmeter 19 while the rest of the water is injected into the formation below packing device 18 through the flowmeter 20. Accordingly, where water is being injected into a well, the total flow into the formation is the sum of the readings of flowmeters 19 and 20 while flowmeter 19 measures the flow into the formation included between packing devices 17 and 18. From these two readings, the permeability of the formation between the packing devices may be compared with the permeability of the formations below packing device 18. The apparatus is also adapted for measuring flow from the adjacent formations into the pipes 16 in a producing well. In this case, the flow into the well from the formation between packing devices 17 and 18 is measured by flowmeter 19 while the flow into the well from the formations below packing device 18 is measured by flowmeter 20. Thus, the flow into the well from the formation between packing devices 17 and 18 may be readily compared with the total flow into the well.

The unit 21 includes a motor and pump assembly 23 which withdraws a predetermined amount of liquid from the hole through a pipe 24 and discharges this liquid through a pipe 25 and an outlet 26 to the portion of the drill hole between packing devices 17 and 18. This enables the flowmeter to be calibrated. For example, if the flowmeter assembly is employed to measure the flow into the well from the surrounding formations, then the reading of flowmeter 19 should increase by the rate at which fluid is passed from inlet 24 to outlet 26. This is apparent because the flow through outlet 26 passes into flowmeter 19 and upwardly through openings 22. If the indicated reading of flowmeter 19 increases by the known rate at which liquid is passed by assembly 23, then it is known that the flowmeter is calibrated properly. If the reading of flowmeter 19 does not increase by this amount, proper calibration can be made.

Figure 3:
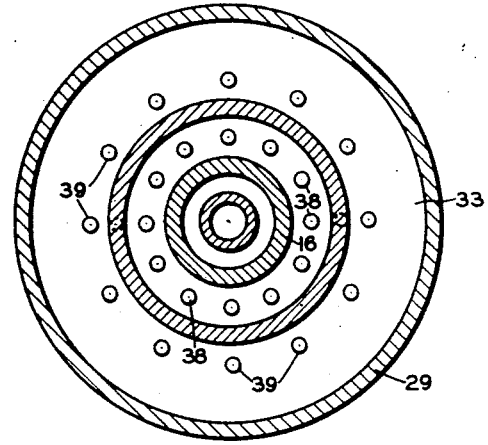
Figure 3 is a sectional view taken along the lines 3—3 of Figure 2.
Figure 2:
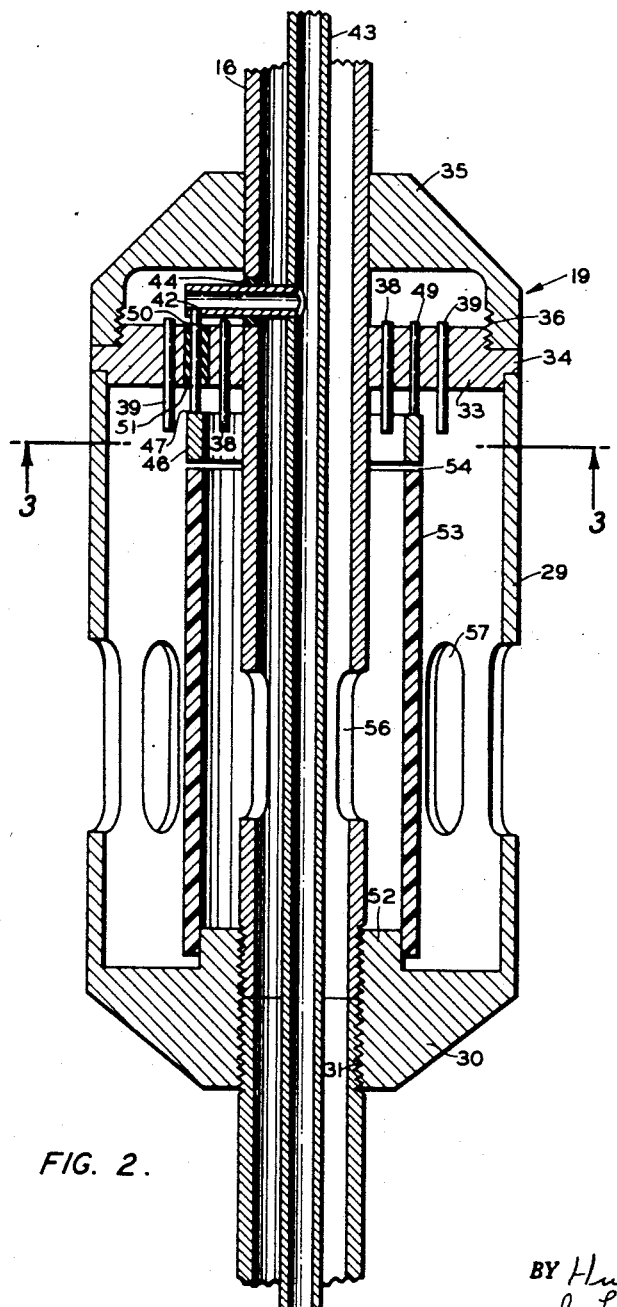
Figure 2 is an enlarged vertical sectional view of one of the flow measuring instruments shown by Figure 1.

The flowmeter units 19 and 20 are of identical construction and will be described in detail in connection with Figures 2 and 3. It will be noted that each flowmeter comprises a generally cylindrical casing 29, the base 30 of which is screw threaded to a threaded portion 31 of the pipe 16. A plate 33 has a flanged portion 34 which fits upon the upper end of casing 29 and the inner region of this plate is tightly fitted against the pipe 16. A cap 35 is screw threaded to threads 36 in the plate 33, and the inner region of this cap also fits tightly against the pipe 16. In this manner, the plate 33 is carried by the pipe and casing in a position generally perpendicular to the axis of the pipe, that is, in a horizontal position, when the flowmeter is suspended in a drill hole. The plate 33 carries an inner set 38 of cold thermocouple junctions and an outer set 39 of hot thermocouple junctions, each junction being mounted in and insulated from the plate 33. Referring to Figure 3, it will be noted that both sets of thermocouple junctions are arranged in generally circular formation about the flowmeter axis. The number of thermocouple junctions used is not critical, although the sensitivity of the apparatus is, of course, increased by the use of a large number of junctions. Each set of junctions is connected in series by suitable conductors, not shown, and the terminating conductors pass through a nipple 42, Figure 2, to a pipe 43 which is disposed within the pipe 16 and mounted concentrically therewith. The inner end of nipple 42 is secured to the pipe 43, as by brazing, and the nipple is insulated from the pipe 16 by a gasket 44.

In accordance with the invention, a metal ring or heating element 46 is positioned between the sets 38, 39 of thermocouple junctions, and the upper surface 47 of this element is held in closely spaced position to the lower surface of plate 33. The element 46 is of sufficiently high resistance as to provide a substantial heating effect when an electrical current is passed therethrough. The heating element is supported in the described position by two diametrically opposite pins 49 and 50, the pin 49 being secured to the plate 33, as by brazing, and the pin 50 extending through the plate 33 for connection, as by brazing, to the nipple 42. The pin 50 is insulated from the plate 33 by a suitable insulating sleeve 51.

When an electrical voltage is applied between the pins 49, 50 in the manner to be hereinafter described, the ring 46 is heated due to the resistance of the metal from which it is formed. It will be noted that the two halves of the ring are, in effect, connected in parallel to the pins when they are arranged in the manner just set forth.

The base 39 has a boss 52 formed at the central region thereof and a cylindrical sleeve 53 is secured to this boss by a force fit. The upper end of sleeve 53 is spaced from the lower end of ring 46 by a gap 54, the width of which may be adjusted by moving the sleeve 53 longitudinally upon the boss 52. The pipe 16 is provided with perforations 56 which are located below plate 33 and the casing 29 is provided with perforations 57 which are in substantially the same horizontal plane as the perforations 56.

Current is supplied to the ring 46 by the transformer unit 15 of Figure 1. Referring now to this figure, it will be noted that the upper end of pipe 16 merges into a casing 59 having a cap 60 at its upper end carrying a metal sealing plug 61. The pipe 43 which is secured to the cap 60 extends axially through casing 59 and is electrically insulated therefrom by means of sleeve 62. A pair of transformer windings 63, 64 of the toroid type are mounted, respectively, on annular cores 65 which are held within the casing 59 by spacers 67. When an alternating current is applied to the windings 63 and 64, a current is induced in the closed circuit consisting of the casing 59, the pipe 16, the plate 33, Figure 2, the pin 49, the two halves of metal ring 46, the pin 50, the nipple 42, the pipe 43, and the cap 60. This induced current heats the element 46 to the desired temperature for operation of the flowmeter. Thus, in effect, the coils 63, 64 constitute the primary winding of the transformer while the casing 59, cap 60, and pipe 43 constitute the transformer secondary winding.

When the element 46 is heated in the manner described, and it is desired to measure the flow of liquid to be injected into the well, a suitable liquid such as water is pumped into the interspace between pipes 16 and 43, this liquid flowing through perforations 56, the interspace between tube 53 and pipe 16 to the cold thermocouple junctions 38. Thence, the liquid flows in a horizontal path past the heating element 46 and the hot thermocouple junctions 39, after which it flows downwardly through the interspace between tube 53 and casing 29 to the perforations 57. The heating element produces a temperature rise in the liquid as it flows from the cold to the hot thermocouple junctions, and this temperature increase is inversely proportional to the flow rate. Thus, the temperature difference between the hot and cold thermocouple junctions is determined by the rate of flow of liquid through the flowmeter and the voltage produced by the two sets of thermocouple junctions gives a direct indication of the flow rate.

I have found that it is quite important that the liquid flow in a horizontal path from the cold thermocouple junction past the heater to the hot thermocouple junctions, the results provided by this horizontal flow being substantially more accurate than where a vertical flow of liquid is used in the flowmeter. Although the invention is not to be limited to any specific theory, I believe that the improved results may be attributed to the lack of convection currents which are set up when a vertical flow is utilized. Where the heater element is located in a vertical pipe between a cold thermocouple and a hot thermocouple, the heating of the liquid causes a vertical current to flow in an upward direction. This current adds to and subtracts from the flow that has to be measured, and thus causes an error.

Where horizontal flow is utilized, this convection current effect is largely reduced, due to the thermal symmetry in the path of laminar flow.

The described arrangement is also advantageous in that a predetermined portion of the liquid is by-passed through the gap 54 and the proportion of the liquid thus by-passed may be regulated by adjusting the vertical position of sleeve 53. Thus, the flowmeter is extremely flexible in that it can handle large volumes of flow by increasing the size of the gap 54 or, alternatively, where small flows are to be measured, the size of the gap may be reduced to provide a more sensitive indication.

Although the flow meter has been described as measuring flow of liquid to be injected into a drill hole, it is equally well adapted to measure the rate of flow from a formation into the hole, as in a producing well. When this result is desired, the two sets of thermocouple junctions are operated so that the units 39 are the cold junctions and the units 38 are the hot junctions. The liquid to be measured flows into the meter through perforations 57, thence upwardly through the interspace between sleeve 53 and casing 29, horizontally past the cold thermocouple junctions at 39, the heater 46, and the hot thermocouple junctions at 38, and then downwardly through the interspace between pipe 16 and sleeve 53 to the perforations 56, after which the liquid flows upwardly through the interspace between pipes 16, 43 to the perforations 22, Figure 1.

Figure 4:
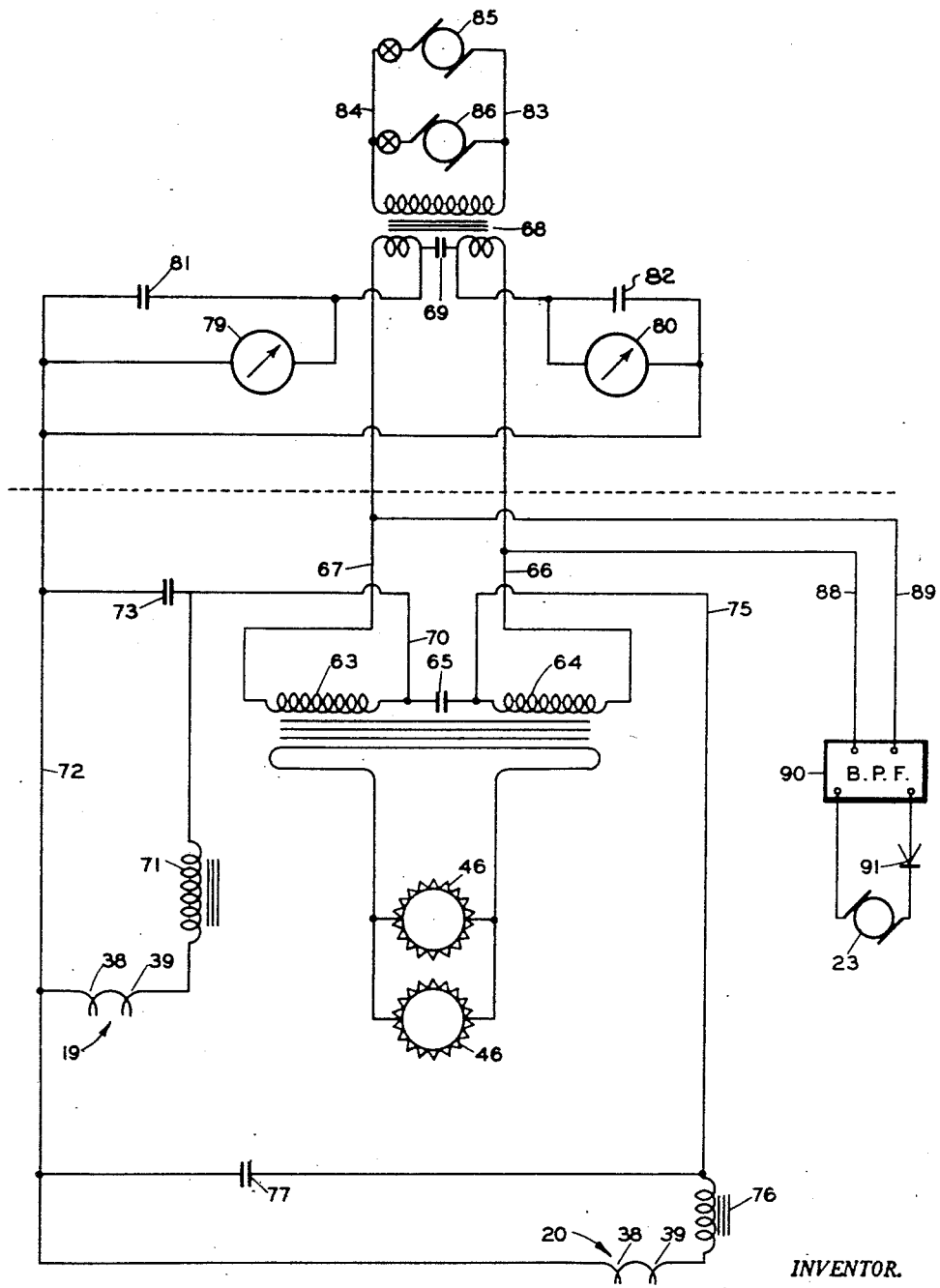
Figure 4 is a schematic circuit diagram utilized for controlling the flowmeter apparatus.

In operating the present flowmeter assembly, the calibration motor 23 and the flowmeter heaters must be selectively energized and direct current circuits must also be provided for obtaining thermocouple readings. In accordance with the present invention, I provide a circuit for accomplishing this result which utilizes a minimum number of conductors between the flowmeter assembly and the surface apparatus. Referring to Figure 4, the apparatus utilized in the flowmeter assembly is indicated below the dotted line and the surface apparatus is indicated above the dotted line. It will be seen that only three conductors are utilized to connect the flowmeter system with the surface apparatus.

The flowmeter portion includes the primary windings 63 and 64 which are interconnected by a condenser 65 and which are connected by conductors 67 and 66, respectively, to a split secondary winding of a transformer 68 which is located at the surface. A condenser 69 is connected between the two sections of this secondary winding. The secondary winding associated with primary winding 63, 64 which, as stated, consists of the casing 59, cap 60 and pipe 43, Figure 1, is connected with the respective heater elements 46 of the flowmeters 19 and 20. A conductor 70 extends from the junction between condenser 65 and the primary winding 63 through a choke 71 and the series connected thermocouple junctions 39, 38 of one flowmeter to a conductor 72 extending to the surface, the choke and thermocouples being shunted by a condenser 73. A conductor 75 extends from the junction between condenser 65 and the primary winding of transformer 64 through a choke 76 and the thermocouple junctions 39, 38 of the other flowmeter to the conductor 72, this choke and set of thermocouple junctions being shunted by a condenser 77. At the surface, the conductor 72 is connected through a meter 79 and a by-pass condenser 81 to conductor 67 through a first secondary winding of transformer 68, and through a meter 80 and a by-pass condenser 81 to conductor 66 through a second secondary winding of transformer 68. The primary winding of transformer 68 is connected by conductors 83 and 84 to a pair of parallel-connected alternating current generators 85 and 86, these generators being of different frequencies.

In the flowmeter assembly, the conductors 66 and 67 are connected, respectively, to a pair of conductors 88, 89 which lead to a band pass filter 90, this filter being connected in circuit with a rectifier 91 and the motor of the combined pump and motor unit 23.

In the operation of the circuit, the transformers 63, 64 are tuned to the frequency of one of the alternating current sources, for example, generator 85. Accordingly, when this generator is energized, a current is induced in the secondary winding of transformer 63, 64 which causes heating current to pass through the elements 46. The current from generator 85 does not affect the motor-pump unit 23 since band pass filter 90 is so tuned as to exclude alternating currents of the frequency produced by generator 85. The filter 90 is tuned to the frequency of the current produced by generator 86 and, accordingly, when this generator is energized, a voltage is passed by the filter which is rectified by the unit 91 and applied to calibration motor 23 to cause operation thereof. The tuning of the transformers 63, 64 is such that they do not respond to currents of the frequency produced by generator 86.

It is a feature of the invention that the conductors 66, 67 also form a part of the direct current galvanometer circuits in addition to their function of supplying current to heater elements 46 and motor 23. It will be noted that the thermocouple elements 38, 39 of one flowmeter are connected in a direct current circuit with meter 79 through conductor 72, choke 71, the primary winding 63 and conductor 67. As a result, the meter 79 registers the direct voltage produced by action of the thermocouple elements, alternating current being excluded from this circuit by the choke 71, by-pass condenser 73 and the by-pass conddenser 81. Similarly, the meter 80 is connected in a direct current circuit with the thermocouple junctions 38, 39 of the other flowmeter by conductor 72, choke 76, conductor 75, the primary winding of transformer 64 and the conductor 66. Accordingly, the meter 80 registers the direct voltage produced by the other thermocouple junctions, alternating current being excluded from this circuit by the choke 76, by-pass condenser 77 and by-pass condenser 82. In this manner, the three conductors 66, 67 and 72 carry all the current necessary for selective actuation of the heaters, operation of motor 23, and measurement of the voltages produced at the thermocouple junctions. Unbalanced alternating currents are excluded from the meter and thermocouple circuit by the balanced arrangement of the alternating current circuits. Thus, the center tapped secondary winding of transformer 68 and the primary windings 63 and 64 define a bridge and the thermocouple junctions are connected in the null arms of the bridge. Thus insofar as alternating currents are concerned, each set of thermocouple junctions is connected between the center tap of the secondary winding of transformer 68 and the central part of the two primary windings 63 and 64. As a result, no alternating current passes through the thermocouple junctions to interfere with the operation thereof and the meters are so connected as not to be affected by the alternating current circuits.

Figure 5:
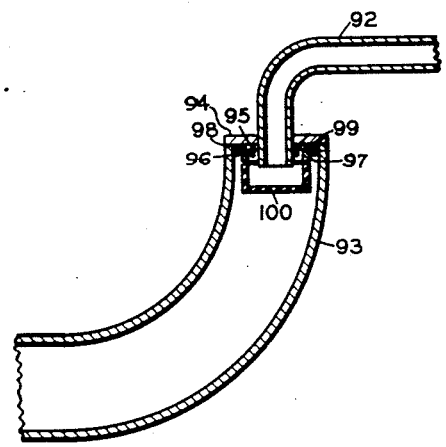
Figure 5 is a vertical sectional view of a flowmeter suitable for measuring the rate of flow in a pipe line.

A simplified type of flowmeter suitable for measuring flow in a pipe line is shown by Figure 5. In this figure, liquid flows from a pipe 92 to a pipe 93 of enlarged cross section, and pipe 93 has a plate 94 secured thereto which is disposed in a horizontal position. The plate 94 carries a set 95 of cold thermocouple junctions and a set 96 of hot thermocouple junctions which are arranged in circular formation as described in connection with Figure 2. An annular heating element 97 is supported by pins 98, 99 protruding downwardly from the plate 94 and the heater element has a closed cap 100 of insulating material secured thereto in any suitable manner. Current is supplied to the heater element through the pins 98, 99 and liquid from pipe 92 flows, in a horizontal path, past the cold thermocouple junctions 95, the heater element 97, and the hot thermocouple junctions 96 so that the difference in potential between the two sets of thermocouple junctions is proportional to the rate of flow through the pipe. I have found that this type of flowmeter is very accurate which, I believe, is due to the lack of interference by convection currents with the flow of liquid past the thermocouple junctions. This flowmeter is also adapted to measure flow in the opposite direction from pipe 93 to pipe 92 by operating the thermocouple units so that the elements 96 are the cold thermocouple junctions and the elements 94 are the hot thermocouple junctions.

While the invention has been described in connection with a present, preferred embodiment thereof, it is to be understood that this description is illustrative only and is not intended to limit the invention, the scope of which is defined by the following claims.

Having described my invention, I claim:

1. A flowmeter comprising, in combination, two concentric pipes, the inner pipe being adapted to receive electrical connectors, and the outer pipe being adapted to discharge liquid into the flowmeter, a metal plate carried by said outer pipe in a position generally perpendicular to the axis of said pipe, an inner set and an outer set of thermocouple junctions both supported by and insulated from said plate, said sets being arranged in generally circular formation, an annular heating element spaced from said plate and positioned radially between said sets of thermocouple junctions, means electrically connecting said heating element to said inner pipe and electrically connecting a diametrically opposite portion of said element to said plate, an outer casing disposed concentrically with respect to said pipes, said outer casing and said pipe being perforated at a region below said plate, means for directing the liquid flow through said perforations and adjacent said thermocouple junctions, an enlarged metal housing positioned at the upper end of the flowmeter unit and electrically connected to said outer pipe, said inner pipe extending through said housing for connection to the top portion thereof, and an induction coil mounted in said housing to induce an electrical current in the loop formed by said housing and said inner pipe, said current being transmitted through said outer pipe, said metal plate, and one of said connecting means to the heating element and thence through the connecting means to the inner pipe.

2. A flowmeter comprising, in combination, two concentric pipes, the inner pipe being adapted to receive electrical conductors, and the outer pipe communicating with the flowmeter, a metal plate carried by said outer pipe in a position generally perpendicular to the axis of said pipe, an inner set and an outer set of thermocouple junctions both supported by and insulated from said plate, said sets being arranged in generally circular formation on the same side of said plate, a nipple communicating with the inner pipe and extending radially through the outer pipe for receiving conductors connecting the thermocouple junctions with the surface, said nipple being insulated from said outer pipe, an annular heating element spaced from said plate and positioned radially between said sets of thermocouple junctions on said same side of said plate, a metal pin connecting said heating element to said nipple, a second metal pin diametrally opposite said first pin connecting said element to said metal plate, an annular sleeve mounted concentrically with said pipe and positioned axially of said heating element on said same side of said plate, one end of said sleeve being spaced from said heating element, an outer casing disposed concentrically with said pipe on said same side of said plate, one end of said casing abutting said plate, the second ends of said sleeve and said casing being in engagement with said pipe at a first location spaced from said plate, said casing and said pipe being perforated at regions between said plate and said first-mentioned region, an enlarged metal housing positioned at the upper end of the flowmeter unit and electrically connected to said outer pipe, said inner pipe extending through said casing for connection to the top portion thereof, and an induction coil mounted in said casing to induce an electrical current in the loop formed by said housing and said inner pipe, said current being transmitted through said outer pipe, said metal plate, and one of said pins to the heating element and thence through the other pin, and said nipple back to the inner pipe.

3. A control circuit for a flowmeter including hot and cold thermocouple junctions and a heater for increasing the temperature of liquid contacting the hot thermocouple junction, comprising, a cable for suspending said flowmeter in a bore hole, said cable including a plurality of electrical conductors, a first circuit including a pair of said conductors to conduct alternating current to said heater, a second circuit to connect a direct current meter to said thermocouple junctions, said second circuit including one of said pair of conductors and a third one of said conductors, and filter means to prevent alternating current from flowing through said second circuit, said filter means comprising an element connected in said second circuit which has high impedance to alternating current and low impedance to direct current.

4. A control circuit for a flowmeter including hot and cold thermocouple junctions and a heater for increasing the temperature of liquid contacting the hot thermocouple junction comprising a cable for suspending said flowmeter in a bore hole and connecting said flowmeter with apparatus at the surface of said bore hole, said cable including three conductors; an alternating current source and a direct current meter forming a part of the surface apparatus; a direct current circuit including said meter, said thermocouple junctions, and a pair of said cable conductors; an alternating current circuit including said source, said heater and one of said pair of said cable conductors and the third of said conductors; and filter means for preventing interference between the alternating and direct currents transmitted by said alternating and direct circuits, said filter means including a capacitor in series with said alternating current circuit and an inductor in series with said direct current circuit.

5. A control circuit for a flowmeter including two sets of hot and cold thermocouple junctions and a pair of heaters for increasing the temperature of liquid contacting the respective hot thermocouple junctions comprising a cable for suspending said flowmeter in a bore hole and connecting said flowmeter with apparatus at the surface of a bore hole, said cable including three conductors; an alternating current source and two direct current meters forming a part of the surface apparatus; an alternating current circuit including said source, said heaters, and a pair of said cable conductors; a first direct current circuit including one of said meters, one of said sets of thermocouple junctions, one of said pair of cable conductors and the third of said conductors; a second direct current circuit including the other of said meters, the other of said sets of thermocouple junctions, the other of said pair of cable conductors and the third of said conductors; and filter means for preventing interference between the alternating and direct currents transmitted by said alternating and direct current circuits, said filter means including a capacitor in series with said alternating current circuit and an inductor in series with each of said first and second direct current circuits.

6. A control circuit for a flowmeter including two sets of hot and cold thermocouple junctions and heaters for increasing the temperature of liquid contacting the respective hot thermocouple junctions comprising; a cable for suspending said flowmeter in a bore hole and connecting said flowmeter with apparatus at the surface of a bore hole, said cable including three conductors; a motor for driving a pump, a pair of alternating current sources of different frequencies and a pair of meters forming a part of the surface apparatus, two direct current circuits each including one of said meters, one set of said thermocouple junctions, and the first and second of said cable conductors, an alternating current circuit tuned to one of said frequencies including said heaters, and a plurality of said cable conductors, a circuit connecting said motor to said last-mentioned cable conductors, said circuit being tuned to the other of said frequencies, and filter means for preventing interference between the alternating and direct currents transmitted by said common cable conductors.

7. A control circuit for a flowmeter including hot and cold thermocouple junctions, and a heater for increasing the temperature of liquid contacting the hot thermocouple junction which comprises, in combination; a transformer in the flowmeter having a secondary turn connected in circuit with said heater and having a center-tapped primary winding, a control unit including a second transformer; an alternating current source connected to the primary winding of said second transformer; a transmission line including two conductors connecting the secondary winding of said second transformer with the primary winding of the flowmeter transformer; a direct current meter connected to one of said conductors and a third conductor in said transmission line; a condenser connecting said third conductor to a center tap on the secondary winding of said second transformer; and a thermocouple circuit including said third conductor, said thermocouple junctions, a filter, and the center tap of the flowmeter primary winding, said filter excluding alternating current from the thermocouple circuit.

8. A control circuit for a flowmeter including hot and cold thermocouple junctions, and a heater for increasing the temperature of liquid contacting the hot thermocouple junction which comprises, in combination, a transformer in the flowmeter having its secondary winding connected in circuit with said heater and having a split primary winding, a control unit including a second transformer, two alternating current sources of different frequencies connected to the primary winding of said second transformer, a transmission line including two conductors connecting the secondary winding of said second transformer with the split winding of the flowmeter transformer, a pump motor, a band pass filter, and a rectifier connected in circuit with said conductors, said split primary winding of said flowmeter transformer and motor circuit being tuned, respectively, to said two different frequencies, a meter connected to one of said conductors and a third conductor in said transmission line, a condenser connecting said third conductor to a center tap on the secondary winding of said second transformer, and a thermocouple circuit including said third conductor, said thermocouple junctions, a filter, and the center tap of the flowmeter primary winding, said filter excluding alternating current from the thermocouple circuit.

9. A control circuit for a flowmeter including two sets of hot and cold thermocouple junctions, and heaters for increasing the temperature of liquid contacting the respective hot thermocouple junctions which comprises, in combination, a transformer in the flow meter having a secondary turn connected in circuit with said heaters and having a split primary winding, a condenser interconnecting the sections of said winding, a control unit including a second transformer, an alternating current source connected to the primary winding of said second transformer, a transmission line including two conductors connecting the secondary winding of said second transformer with the split winding of the flowmeter transformer, a meter connected to one of said conductors and a third conductor in said transmission line, a second meter connected to the second and third conductors, a condenser connecting said third conductor to a center tap on the secondary winding of said second transformer, and a pair of thermocouple circuits each including said third conductor, one set of thermocouple junctions, a filter, and the center terminal of one of said flowmeter windings, said filters excluding alternating current from the thermocouple circuits.

10. A control circuit for a flowmeter including two sets of hot and cold thermocouple junctions, and heaters for increasing the temperature of liquid contacting the respective hot thermocouple junctions which comprises, in combination, a transformer in the flow meter having a secondary turn connected in circuit with said heaters and having a split primary winding, a control unit including a second transformer, two alternating current sources of different frequencies connected to the primary winding of said secondary transformer, a transmission line including two conductors connecting the secondary winding of said second transformer with the split winding of the flowmeter transformer, a pump motor, a band pass filter, and a rectifier connected in circuit with said conductors, said split primary winding of said flowmeter transformer and said motor circuit being tuned, respectively, to said two different frequencies, a meter connected to one of said conductors and a third conductor in said transmission line, a second meter connected to the second and third conductors, a condenser connecting said third conductor to a center tap on the secondary winding of said second transformer, and a pair of thermocouple circuits each including said third conductor, one set of thermocouple junctions, a filter, and the center terminal of one of said flowmeter windings, said filters excluding alternating current from the thermocouple circuits.

11. A flowmeter comprising, in combination, a pipe for conveying liquid, a plate carried by said pipe in a position generally perpendicular to the axis of said pipe, an inner set and an outer set of thermocouple junctions both supported by said plate on the same side thereof and arranged in generally circular formations about said pipe, a heating element positioned between said inner and said outer sets of thermocouple junctions on said same side of said plate, an annular sleeve mounted concentrically with said pipe on said same side of said plate, one end of said sleeve being in spaced relation with said heating element, and a casing mounted concentrically with said pipe outside said sleeve, one end of said casing being in engagement with said plate, said casing and said pipe being perforated at regions spaced from said plate on said same side of said plate, the second ends of said sleeve and said casing being in engagement with said pipe whereby a fluid passage is defined between the interior of said pipe and the exterior of said casing through the perforations in said pipe, past said inner set of thermocouple junctions, past said heating element, past outer set of thermocouple junctions and through the perforations in said casing.

12. A flowmeter comprising, in combination, a pipe, an annular plate carried by said pipe in a position generally perpendicular to the axis of said pipe, an inner set and an outer set of thermocouple junctions both attached to one side of said plate and both arranged in respective generally circular paths, an annular heating element positioned between said sets of thermocouple junctions on said same side of said plate, a casing mounted concentrically with said pipe, one end of said casing engaging said plate, a sleeve member mounted concentrically with said pipe between said pipe and said casing, one end of said sleeve member being in closely spaced relation with said heating element, the second end of said sleeve member and the second end of said casing being connected to said pipe at a region spaced from said plate on said one side of said plate, said pipe and said casing being perforated at regions between said plate and said first mentioned region whereby liquid injected into said pipe flows through the perforations in said pipe, through the interspace between said pipe and said sleeve, adjacent said thermocouple junctions and said heating element, through the interspace between said sleeve and said casing, and through the perforations in said casing.

13. A flowmeter comprising, in combination, a pipe for conveying liquid vertically through a bore hole, an annular plate carried by said pipe in a position generally perpendicular to the axis of said pipe, an annular inner set and an annular outer set of thermocouple junctions mounted concentrically about said pipe below said plate when said flowmeter is positioned in a bore hole, an annular heating element mounted below said plate between said sets of thermocouple junctions, and an annular sleeve mounted concentrically with said pipe, the diameter of said sleeve being substantially the same as the diameter of said heating element, said sleeve being positioned such that one end thereof is in closely spaced relation with said heating element, a casing mounted concentrically with said pipe, one end of said casing engaging said plate, the second ends of said sleeve and said casing engaging said pipe at a region spaced below said plate, said pipe and said casing being perforated at regions between the ends of said casing and said sleeve whereby a flow path is defined between the interior of said pipe and the exterior of said casing through the perforations in said pipe, the annular space between said pipe and said sleeve, the annular space between said sleeve and said casing, and the perforations in said casing.

14. A flowmeter comprising, in combination, a pipe, a plate carried by said pipe in a position generally perpendicular to the axis of said pipe, an inner annular set of thermocouple junctions and an outer annular set of thermocouple junctions both supported by said plate on the same side thereof, an annular heating element supported by said plate on said same side of said plate and positioned between said sets of thermocouple junctions, an annular sleeve mounted concentrically with said pipe and said heating element on said same side of said plate, said sleeve being of substantially the same diameter as said heating element, said sleeve being longitudinally movable with respect to said heating element such that one end of said sleeve can be positioned at predetermined distances from said heating element, and an outer casing mounted concentrically with said pipe on said same side of said plate, one end of said casing abutting said plate, the second ends of said casing and said sleeve being attached to said pipe at a region spaced from said plate on said same side of said plate, said casing and said pipe being perforated at regions spaced between said plate and said first-mentioned region.

15. Flow measuring apparatus comprising a flowmeter assembly adapted to be positioned in a conduit, said assembly including first and second packing devices attached thereto and extending outwardly therefrom to engage the walls of the conduit in which said assembly is positioned, said first and second packing devices being spaced from one another to form first, second and third regions in the conduit external of said assembly, a first flowmeter forming a part of said assembly, said first flowmeter having fluid inlet and outlet openings, first conduit means forming a part of said assembly and communicating between one opening of said first flowmeter and said first region in the conduit, said first region being on the side of said first packing device opposite said second packing device, the second opening of said first flowmeter communicating with said second region between said first and second packing devices, a second flowmeter forming a part of said assembly, said second flowmeter having fluid inlet and outlet openings, and second conduit means forming a part of said assembly and communicating between said first region in the conduit and one opening of said second flowmeter, said second conduit means being independent of the fluid flow path through said first flowmeter between the inlet and outlet openings thereof, the second opening of said second flowmeter communicating with said third region in the conduit on the side of said second packing device opposite said first packing device.

16. The combination in accordance with claim 15 further comprising a pump carried by said assembly, said pump having fluid inlet and outlet openings, one opening of said pump communicating with said third region and the second opening of said pump communicating with said second region.

17. Flow measuring apparatus comprising a pipe adapted to be positioned axially in a bore hole, said pipe being perforated at first and second spaced locations thereon, first and second packing devices attached to said pipe and extending outwardly therefrom to engage the walls of the bore hole in which said pipe is positioned, said first packing device being mounted on said pipe between said perforations, said second packing device being mounted on said pipe at a region above both perforations when the pipe is positioned vertically in a bore hole, said packing devices thereby dividing the region of said bore hole external of said pipe into first, second and third regions, said first region being above the two packing devices, said second region being between the two packing devices, and said third region being below the two packing devices, a first flowmeter carried by said pipe whereby one fluid opening thereof communicates with the perforations in said pipe between said packing devices, the second fluid opening of said first flowmeter communicating with said second region in the bore hole, and a second flowmeter carried by said pipe whereby one fluid opening thereof is in communication with the perforations in said pipe below said two packing devices, the second fluid opening of said second flowmeter communicating with said third region in the bore hole, the upper end of said pipe being in communication with said first region in the bore hole.

18. The combination in accordance with claim 17 further comprising a pump carried by the lower end of said pipe, one fluid opening of said pump being in communication with said third region in the bore hole, and a conduit attached to the second fluid opening of said pump and extending into said second region in the bore hole.

19. The combination in accordance with claim 17 wherein each of said two flowmeters comprises a plate carried by said pipe in a position generally perpendicular to the axis of said pipe above a respective one of said first and second locations, an annular inner set and an annular outer set of thermocouple junctions mounted concentrically about said pipe below said plate when said assembly is positioned in a bore hole, an annular heating element mounted below said plate between said sets of thermocouple junctions, an annular sleeve mounted concentrically with said pipe, the diameter of said sleeve being substantially the same as the diameter of said heating element, said sleeve being positioned such that one end thereof is in closely spaced relation with said heating element, and a casing mounted concentrically with said pipe on the outside thereof, one end of said casing engaging said pipe at a region below said plate and below a respective one of said locations, said casing being perforated at a region between the ends of said casing and said sleeve whereby a flow path is defined between the interior of said pipe and the exterior of said casing through the perforations in said pipe, through the annular space between said pipe and said sleeve, past said heating element, through the annular space between said sleeve and said casing, and through the perforations in said casing.

References Cited in the file of this patent

UNITED STATES PATENTS

| | | |
|---|---|---|
| 1,406,682 | Rathbone | Feb. 14, 1922 |
| 2,197,818 | Tozier | Apr. 23, 1940 |
| 2,379,138 | Fitting, Jr., et al. | June 26, 1945 |
| 2,540,822 | Hastings | Feb. 6, 1951 |